United States Patent Office 3,116,288
Patented Dec. 31, 1963

3,116,288
9α-HALO-11β-HYDROXY - 11α - ALKYL STEROIDS OF THE PREGNANE SERIES AND INTERMEDIATES THEREFOR
Josef Fried, Princeton, N.J., and Gordon H. Thomas, Birmingham, England, assignors to Olin Mathieson Chemical Corporation, New York, N.Y., a corporation of Virginia
No Drawing. Filed Oct. 20, 1959, Ser. No. 847,460
8 Claims. (Cl. 260—239.55)

This application is a continuation-in-part of our parent application, Serial No. 697,799, filed November 21, 1957, now abandoned.

This invention relates to the synthesis of steroids, and has for its object the provision of a new class of physiologically active steroids, which may be represented by the formula

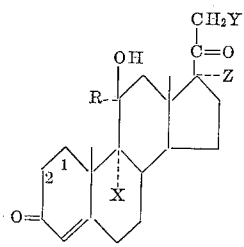

wherein the 1,2-position is saturated or double-bonded, R is lower alkyl, (preferably methyl), X is a halogen of atomic number greater than nine (i.e. iodine, bromine, and particularly chlorine), Y is hydrogen, hydroxy or acyloxy, and Z is hydrogen or α-hydroxy.

The new steroids of this invention are prepared by interacting a lithium lower alkyl (e.g. lithium methyl or lithium ethyl) with a 3,20-diketal of one of the following: 9α-fluoro-11-ketoprogesterone; 9α-fluoro-Δ$^{1,4}$-pregnadiene-3,11,20-trione; 9α-fluorocortisone or a 21-ester thereof; 9α-fluoroprednisone or a 21-ester thereof; 9α-fluoro-11-keto - 17α - hydroxyprogesterone; 9α - fluoro - Δ$^{1,4}$ - pregnadiene-17α-ol-3,11,20-trione; 9α-fluoro-11-dehydrocorticosterone or a 21-ester thereof; and 9α-fluoro-Δ$^{1,4}$-pregnadiene-21-ol-3,11,20-trione or a 21-ester thereof, there by yielding the new intermediates of this invention, the corresponding 3,20-diketal of steroids of the general formula

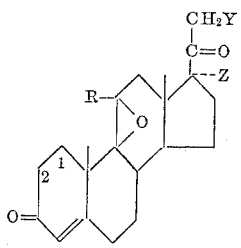

wherein the 1,2-position is saturated or double-bonded, R is lower alkyl (preferably methyl), Y is hydrogen, hydroxy or acyloxy, and Z is hydrogen or α-hydroxy.

[The 3,20-diketal starting materials can be prepared in the usual manner by the method disclosed in our application, Serial No. 663,597, filed June 5, 1957, now Patent No. 2,963,496, by treating the corresponding 3,20-diketo steroid with, for example, a dihydric alcohol, such as ethylene glycol and propylene, in the presence of an acid catalyst.]

The resulting 3,20-diketals can then be treated with a hydrogen halide, wherein the halogen has an atomic number greater than nine (i.e. hydrogen iodide, hydrogen bromide, and preferably hydrogen chloride), thereby hydrolyzing the 3,20-diketal groups and opening the epoxide ring to yield the corresponding 9α-halo-11β-hydroxy derivatives.

If a free 21-hydroxy steroid is obtained and a 21-ester is desired, the 21-hydroxy compound can be acylated in the usual manner as by treatment with an acyl halide or acid anhydride of the desired acid. Particularly preferred are the acyl chlorides and acid anhydrides of hydrocarbon carboxylic acids having less than ten carbon atoms, as exemplified by the lower alkanoic acids (e.g. acetic, propionic and enanthic acid), the monocyclic aromatic carboxylic acids (e.g. benzoic and toluic acid), the monocyclic aralkanoic acids (e.g. phenacetic and β-phenylpropionic acid), the lower alkenoic acids, the cycloalkane carboxylic acids, and the cycloalkene carboxylic acids. The acylation is preferably conducted in the presence of an organic base, such as pyridine.

Although any 3,20-diketal may be used as the starting material, the preferred diketals are those of 1,2 or 1,3-dihydric alcohols such as ethylene glycol and propylene glycol.

The 9α-halo steroids of this invention are physiologically active substances which possess anti-inflammatory activity. Hence the steroids of this invention can be used in lieu of known anti-inflammatory steroids, such as hydrocortisone, in the treatment of rheumatoid arthritis, being formulated for such administration in the same type of per-oral preparations as hydrocortisone, for example, with concentration and/or dosage based on the activity of the particular compound.

The following examples are illustrative of the invention (all temperatures being in centigrade):

EXAMPLE 1

*11α-Methyl-9β,11β-Epoxyprogesterone 3,20-Bis-Ethylene Ketal*

(a) *Preparation of 9α-fluoro-11-ketoprogesterone 3, 20-bisethylene ketal.*—A mixture of 10 g. of 9α-fluoro-11-ketoprogesterone, 350 ml. of benzene, 80 ml. of ethylene glycol and 200 mg. of paratoluenesulfonic acid monohydrate is refluxed with stirring for 72 hours. The reaction mixture is then cooled to room temperature and neutralized with sodium bicarbonate solution. The phases are separated and the aqueous layer reextracted with additional amounts of benzene. The combined benzene extracts are washed with water, dried over sodium sulfate and evaporated to dryness in vacuo. The crude residue on crystallization from acetone-hexane yields about 11 g. of the essentially pure bis-ethylene ketal melting at about 179–182°. Recrystallization of this material from methanol gives an analytical sample of the following properties: M.P. about 189–190°; [α]$_D^{23}$ —25°.

(b) *Preparation of 11α-methyl-9β,11β-epoxyprogesterone 3,20-bis-ethylene ketal.*—3.5 g. of 9α-fluoro-11-ketoprogesterone 3,20-bis-ethylene ketal in 280 ml. of ether is stirred at room temperature overnight with 53 ml. of an etheral solution of lithium methyl (12.6 mg./ml.). The excess lithium methyl is decomposed by the addition of ice. Chloroform is added, and the mixture is washed several times with water, dried over sodium sulfate and evaporated in vacuo. Crystallization of the residue from methanol gives about 2.2 g. of 12α-methyl-11-ketoprogesterone 3,20-bis-ethylene ketal having M.P. about 135–138°. Concentration of the mother liquor yields a second crop of material which is recrystallized twice from chloroform-methanol to give a pure sample of 11α-methyl-9β,11β-epoxyprogesterone 3,20-bis-ethylene ketal (about 100 mg.), M.P. about 194–196°, $[\alpha]_D$ +97.6° (c. 1.02 in chloroform)

$$\lambda^{Nujol}_{max.}$$

no absorption in the hydroxyl or carbonyl region.

Analysis.—Calcd. for $C_{26}H_{38}O_5$ (430.56): C, 72.50; H, 8.90. Found: C, 72.32; H, 8.64.

Similarly, if lithium ethyl is substituted for the lithium methyl in the procedure of Example 1, 11α-ethyl-9β-epoxyprogesterone 3,20-bis-ethylene ketal and 12a-ethyl-11-ketoprogesterone 3,20-bis-ethylene ketal is obtained.

EXAMPLE 2

*11α-Methyl-9β,11β-Epoxy-Δ⁴-Pregnene-17α,21-Diol-3,20-Dione 3,20-Bis-Ethylene Ketal*

To an ethereal solution of methyl lithium prepared from 2.64 g. of lithium and 11 ml. of methyl bromide in 200 ml. of ether is added 5.51 g. of 9α-fluorocortisone 3,20-bis-ethylene ketal in 1,200 ml. of benzene. The resulting solution is stirred at room temperature for three hours with the exclusion of air. Excess methyl lithium is decomposed by the cautious addition of ice and the benzene layer separated from the aqueous phase. The benzene extract is washed neutral with water, dried over sodium sulfate and evaporated to dryness in vacuo. The amorphous residue crystallizes readily upon addition of methanol. The first crop after two recrystallizations from methanol furnishes pure 11α-methyl-9β,11β-epoxy-Δ⁴-pregnene-17α,21-diol-3,20-dione 3,20-bis-ethylene ketal (about 550 mg.) of the following properties: M.P. about 199–200°; $[\alpha]_D^{23}$ +66° (c. 1.0 in chloroform);

$$\lambda^{Nujol}_{max.} 2.84\mu$$

(no carbonyl bands).

Analysis.—Calcd. for $C_{26}H_{38}O_7$ (462.56): C, 67.51; H, 8.28. Found: C, 67.27; H, 8.23.

In a similar manner, by substituting one of the following: 9α-fluoro-Δ¹,⁴-pregnadiene-3,11,20-trione, 9α-fluoroprednisone, 9α-fluoro-11-keto-17α-hydroxyprogesterone, 9α-fluoro-Δ¹,⁴-pregnadiene-17α-ol-3,11,20-trione, 9α-fluoro-11-dehydrocorticosterone, and 9α-fluoro-Δ¹,⁴-pregnadiene-21-ol-3,11,20-trione, for the 9α-fluoro-11-ketoprogesterone in the procedure of Example 1, step (a), and following the procedure of the example, one of the following (respectively) is formed: 11α-methyl-9β,11β-epoxy-Δ¹,⁴-pregnadiene-3,20-dione 3,20-bis-ethylene ketal; 11α-methyl-9β,11β-epoxy-Δ¹,⁴-pregnadiene-17α,21-diol-3,20-dione 3,20-bis-ethylene ketal; 11α-methyl-9β,11β-epoxy-Δ⁴-pregnene-17α-ol-3,20-dione 3,20-bis-ethylene ketal; 11α-methyl-9β,11β-epoxy-Δ¹,⁴-pregnadiene-17α-ol-3,20-dione 3,20-bis-ethylene ketal; 11α-methyl-9β,11β-epoxy-Δ⁴-pregnene-21-ol-3,20-dione 3,20-bis-ethylene ketal; and 11α-methyl-9β,11β-epoxy-Δ¹,⁴-pregnadiene-21-ol-3,20-dione 3,20-bis-ethylene ketal.

EXAMPLE 3

*9α-Chloro-11α-Methylhydrocortisone*

To a solution of 100 mg. of 11α-methyl-9β,11β-oxido-Δ⁴-pregnene-17α,21-diol-3,20-dione-3,20-bis-ethylene ketal in 10 ml. of chloroform is added at 0° 3 ml. of a 0.5 N solution of hydrogen chloride in chloroform. After 1 hour at 0° the solution is neutralized with aqueous sodium bicarbonate and the chloroform layer washed with water, dried over sodium sulfate and evaporated to dryness in vacuo. The residue crystallizes readily from acetone and yields in three consecutive fractions about 53 mgs. of material melting between 230–235°. Infrared spectra indicate that this material consists of a mixture of 20-monoketal and non-ketalized 9α-chloro-11α-methylhydrocortisone. The material is completely hydrolyzed by refluxing it with 10 ml. of methanol and 0.34 ml. of 8% sulfuric acid for 40 minutes. Water is added and the mixture neutralized with dilute sodium bicarbonate. Extraction with ethyl acetate and drying of the resulting extract over sodium sulfate furnishes after evaporation of the solvent the crude chlorohydrin which after recrystallization from acetone has the following properties: M.P. about 236–237° (dec.); $[\alpha]_D^{23}$ +168° (c. 0.33 in 19% ethanol);

$$\lambda^{Nujol}_{max.} 2.99, 5.88, 6.13\mu$$

Analysis.—Calcd. for $C_{22}H_{31}O_5Cl$ (410.91): C, 64.30; H, 7.60. Found: C, 64.74; H, 7.77.

Similarly, if hydrogen bromide is substituted for the hydrogen chloride in the procedure of Example 3, 9α-bromo-11α-methylhydrocortisone is recovered as the major product.

EXAMPLE 4

*9α-Chloro-11β-Hydroxy-11α-Methylprogesterone*

Following the procedure of Example 3, but substituting 100 mg. of 11α-methyl-9β,11β-oxidoprogesterone 3,20-bis-ethylene ketal for the 11α-methyl-9β,11β-oxido-Δ⁴-pregnene-17α-21-diol-3,20-dione 3,20-bis-ethylene ketal of the example, there is obtained 9α-chloro-11β-hydroxy-11α-methylprogesterone.

Furthermore, upon substitution of any of the other 9β,11β-oxido intermediates of this invention for the steroid reactants in Examples 3 and 4, the corresponding 9α-chloro-11β-hydroxy derivatives are obtained.

EXAMPLE 5

*9α-Chloro-11α-Methylhydrocortisone 21-Acetate*

A solution of 20 mg. of 9α-chloro-11α-methylhydrocortisone in ½ ml. of pyridine and ¼ ml. of acetic anhydride is allowed to stand for 18 hours at room temperature. Evaporation of the reagents leaves a crystalline residue, which after recrystallization from acetone-hexane has the following properties: M.P. about 268–269° (dec.); $[\alpha]_D^{23}$ +175° (c. 0.25 in 95% alcohol);

$$\lambda^{alc.}_{max.} 242\ m\mu\ (\epsilon = 19,100);\ \lambda^{Nujol}_{max.} 2.83, 3.04, 5.68, 5.80, 6.09, 6.20\mu$$

Analysis.—Calcd. for $C_{24}H_{33}O_6Cl$ (452.95): C, 63.63; H, 7.34. Found: C, 63.60; H, 7.34.

Furthermore, upon substitution of another acylating agent such as propionic anhydride or benzoyl chloride for the acetic anhydride in the procedure of Example 5, the corresponding 21-esters are formed. Moreover, the general procedure of Example 5 is applicable for the esterification of any of the steroids of this invention which contain a free hydroxy group in the 21-position.

The invention may be otherwise variously embodied within the scope of the appended claims.

What is claimed is:

1. A 3,20-diketal of a steroid selected from the group consisting of those of the formulae

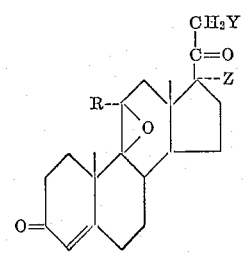

and

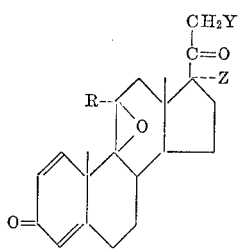

wherein R is lower alkyl, Y is selected from the group consisting of hydrogen, hydroxy and acyloxy, and Z is selected from the group consisting of hydrogen and α-hydroxy.

2. 11α-methyl-9β,11β-epoxyprogesterone 3,20-bis-ethylene ketal.

3. 11α - methyl - 9β,11β - epoxy - Δ$^5$ - pregnene - 17α, 21-diol-3,20-dione 3,20-bis-ethylene ketal.

4. A process for preparing a compound selected from the group consisting of those of the formulae

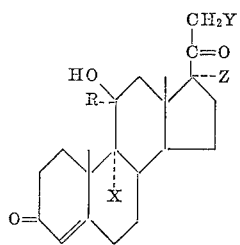

and

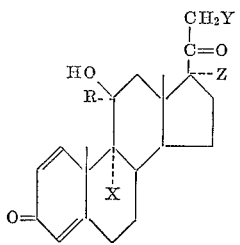

wherein R is lower alkyl, X is a halogen of atomic number greater than nine, Y is selected from the group consisting of hydrogen, hydroxy and acyloxy, and Z is selected from the group consisting of hydrogen and α-hydroxy, which comprises interacting a corresponding compound of claim 1 with a hydrogen halide, wherein the halide has an atomic number greater than nine.

5. A process for preparing 9α-chloro-11α-methylhydrocortisone which comprises interacting 11α-methyl-9β,11β-epoxy-Δ$^5$-pregnene-17α,21-diol-3,20-dione 3,20-bis-ethylene ketal with hydrogen chloride.

6. A process for preparing a compound of claim 1 which comprises interacting a 3,20-diketal of a steroid selected from the group consisting of those of the formulae

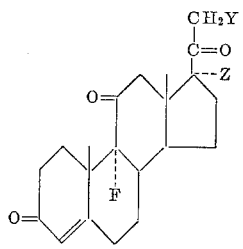

and

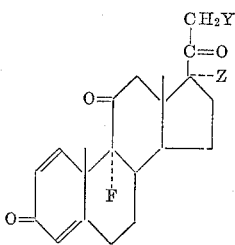

wherein Y is selected from the group consisting of hydrogen, hydroxy and acyloxy, and Z is selected from the group consisting of hydrogen and α-hydroxy, with lithium lower alkyl.

7. A process for preparing 11α-methyl-9β,11β-epoxyprogesterone 3,20-bis-ethylene ketal which comprises interacting 9α-fluoro-11-ketoprogesterone 3,20-bis-ethylene ketal with lithium methyl.

8. A process for preparing 11α-methyl-9β,11β-epoxy-Δ$^5$-pregnene-17α,21-diol-3,20-dione 3,20-bis-ethylene ketal which comprises interacting 9α-fluorocortisone 3,20-bis-ethylene ketal with lithium methyl.

References Cited in the file of this patent

UNITED STATES PATENTS

| | | |
|---|---|---|
| 2,736,681 | Tishler | Feb. 28, 1956 |
| 2,763,671 | Fried et al. | Sept. 18, 1956 |
| 2,854,383 | Herzog | Sept. 30, 1958 |

OTHER REFERENCES

Fried et al.: Journal of American Chem. Society, vol. 75 (1953), page 2273 relied on.